July 13, 1943.  S. C. CUNNINGHAM  2,324,137
FOOD CONTAINER
Filed May 28, 1938

Inventor.
Samuel C. Cunningham
By Morris Michael Marks
Attorney.

Patented July 13, 1943

2,324,137

UNITED STATES PATENT OFFICE 2,324,137

FOOD CONTAINER

Samuel C. Cunningham, Philadelphia, Pa.

Application May 28, 1938, Serial No. 210,703

12 Claims. (Cl. 53—6)

My invention relates to food containers, and it relates more particularly to containers for foods, such as deviled crabs, baked potatoes, and the like, which are required to be subjected to heat while in their containers, or in any other similar manner to be prepared for serving.

There are certain foods of which deviled crabs, deviled clams, baked potatoes, and the like, are examples, which are normally served to the diner in a natural container. Indeed, the public has learned to expect the natural container as a normal concomitant of the food. To meet the resultant demand of the public, restaurants and other large cooking establishments have almost universally resorted to the practice, dictated by efficiency, of purchasing wholesale quantities of the food, already picked from its natural container, and by separate purchase, wholesale quantities of natural containers from which the food has already been picked, and using the food in conjunction with the container as the need arises. Thus, taking deviled crabs as an example, the crabs when first caught are boiled and the meat is picked out of the crab shell. The meat is then packed and shipped to restaurants and other large cooking establishments. The shells are likewise packed and shipped to these purchasers. The purchaser then prepares the deviled crab by preparing his crab-meat composition and inserting it into one of the crab shells. Coating it with bread crumbs and/or cracker dust and cooking it in deep fat completes the cooking process.

But the result has been highly unsatisfactory. Thus, it is virtually impossible for the packer of crab-meat to remove all of the crab meat from the shell. Small particles of meat still adhere to it despite his best efforts at removal. The chef is usually aware of this and is often under instructions to boil the shell with washing soda before use, to help to eliminate the impurities due to the decayed crab-meat. But a busy chef rarely has time to take this precautionary measure, and deviled crabs are in an appalling number of cases prepared and served to customers in shells containing decayed crab-meat. Indeed, it is to this condition, and rarely to impurities in the separately purchased crab-meat, that ptomaine poisoning following the use of deviled crabs is attributable.

Moreover, empty crab shells, under the present general practice, are shipped in large boxes containing all manner of sizes, shapes and conditions of shells. Most of these shells are either too large or too small, or too broken to be acceptable for use as the container part of a deviled crab.

One object of my invention, therefore, is to provide a container for a deviled crab or similar food, which shall be completely sanitary and of a uniform size.

Another object of my invention is to provide a container for a food such as a deviled crab, which shall be inexpensive to make and yet capable of withstanding the extreme heat of deep-frying in hot fat.

A further object of my invention is to provide a container for foods, such as deviled crabs, deviled clams, baked potatoes or the like, which shall bear a similitude to a natural container for said foods.

With the above and other objects in view, my invention consists of a container for foods, such as deviled crab or the like, which shall be made of papier-mâché shaped in a manner to simulate the natural container for the food, for instance, in the case of a deviled crab, a crab shell.

My invention also consists in a method of making a container for foods which comprises the provision of a composition comprising a pulp derivative, a carbohydrate, a clay derivative, a gum, and a germicide, and shaping such composition in the form of a container in a manner to simulate a container normally made in another manner.

My invention further consists of a deviled crab comprising a crab-meat composition, retained in a papier-mâché container having a similitude to a crab shell, and coated with crumbs; the whole being deep-fried in fat.

For the purpose of illustrating my invention, I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawing in which like reference characters indicate like parts:

In accordance with my invention, I provide a papier-mâché composition which preferably comprises a paper or similar cellulose element, which may be paper or paper pulp; a carbohydrate ingredient, which may be flour or starch or both; a refractory element, such as clay, chalk or any clay or chalk derivative, such as whiting; a glue or other binder, such as gum; and a germicide to prevent fermentation of the composition, such as alum.

Thus, I may provide two blotter-like sheets of paper 10 and 11 and three sheets of close-fibered rice-straw tissue 12, 13 and 14. These sheets of paper and tissue are made to adhere to each other by means of a paste formed of a composition made in the following proportions: 2 pounds of flour, one pound of whiting, ½ pound of glue or gum, and a small piece of alum—all mixed with water to the consistency of a thin paste. If desired, however, I may make this paste of a composition as follows: 10 oz. of flour, 15 oz. of white starch, and a tablespoonful of alum, all stirred with a little water until it has substantially the thickness of cream. Boiling water is then added, and the whole boiled and stirred in a manner to prevent the formation of lumps. After cooling, and preferably just before using in conjunction with the papers and tissues, a little Spanish whiting is added.

Although I have herein given the formulae of two desirable compositions, any other desired composition may be used, but it is preferred that such composition contain a refractory element, a binder element, a carbohydrate element, a paper element, and an inocuous germicide.

Figure 8:
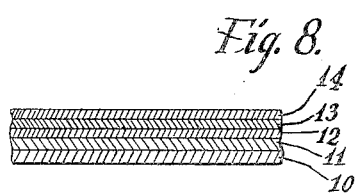
Figure 8 represents a sectional elevational view, greatly enlarged, of a papier-mâché composition which may be used in forming the container embodied in my invention.

Moreover, the paper need not be in the proportions or laid in the order illustrated in Figure 8. Thus, the paper may be laid in the following order: A blotter-like sheet 10 on the bottom, a tissue sheet 12 laid thereupon, another blotter-like sheet 11 laid upon the tissue sheet 12, and two remaining tissue sheets 13 and 14 laid upon the blotter-like sheet 11.

Care should be taken in any event to cause the paste to permeate all the sheets 10 to 14 inclusive.

I then use any of various desired means for shaping the resultant papier-mâché composition. Thus, I may use counter-dies, such as a cameo and an intaglio die to impress therebetween the papier-mâché composition into the shape of a container, preferably having the similitude of a natural container for a food, such as a crab shell. Or, I may use an intaglio or cameo die into or upon which is beaten or rolled the papier-mâché composition, until the composition is in the shape of the desired container. In any case, however, it is preferred to spread a thin coating of olive oil upon the die in order to prevent the papier-mâché composition from adhering to the die.

Or, I may form the papier-mâché composition in sheets, cut said sheets in any desired manner, and then form the cut sheets, by hand or otherwise, into the shape of the desired container.

Whichever method of shaping the papier-mâché composition is used, so long as the compositions hereinabove described are used, it is preferred to de-hydrate the composition contemporaneously with, or subsequent to, the container-forming operation. Thus, a closely-woven highly absorbent stout felt blanket may be placed on the papier-mâché composition, intermediate the composition and one of the dies, and the whole subjected to a pressure which forces the moisture out of the composition and into the absorbent felt blanket. The de-hydrating process may be further augmented by heating the die immediately adjacent the papier-mâché composition. The heat thus drives moisture from the composition to the felt blanket. However, any of various known methods may be used for de-hydrating the papier-mâché composition, and my invention is not limited to the above described methods.

A modification of my invention is to form the papier-mâché composition in sheets, dry or semi-dry the composition, cut said sheets in any desired form, and join various portions of the cut sheet in a manner to form a container; and then complete the drying process by baking or otherwise.

Furthermore, if desired, paper pulp may be used instead of the blotter-like sheets and tissues illustrated in Figure 8. Thus, desired quantities of the papier-mâché composition in pulp form may be placed in molds having a die shape, and the composition swaged into the desired container form. As previously described, this swaging process may also be contemporaneous with the de-hydrating process, but if desired, the de-hydrating process may follow the swaging process and may be done either by using an absorbent fabric to absorb the moisture, preferably in conjunction with pressure, or by driving heat from one surface of the container to and through another, thereby carrying with it the moisture contained therein, all as hereinbefore described, or it may be done by baking the container.

In accordance with my invention, the papier-mâché container may be made to bear any manner of similitude to the natural container for a food. Also, it may be shaped to bear a similitude to a food container of any other description. For the purposes of illustration, however, I have shown in the accompanying drawing papier-mâché containers having the similitude of crab shells for use in deviled crabs. It is to be understood, however, that my invention is equally adaptable for use in conjunction with any other food, and may comprise a food container simulating a clam shell, a baked potato peel or any other preferred food container.

Figure 1:
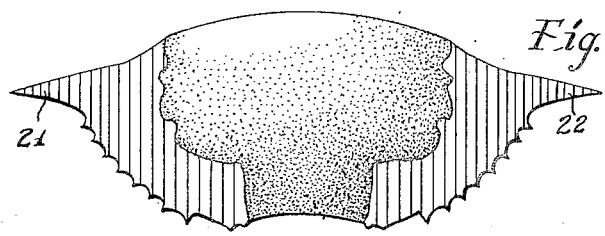
Figure 1 represents a plan view of a deviled crab formed in accordance with my invention.
Figure 2:
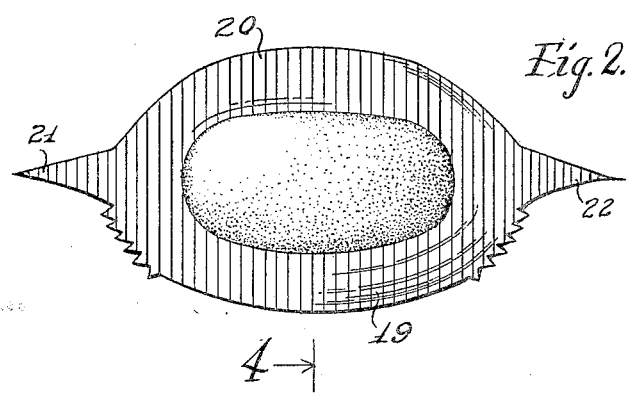
Figure 2 represents a plan view of a deviled crab of modified construction, embodying my invention.
Figure 3:
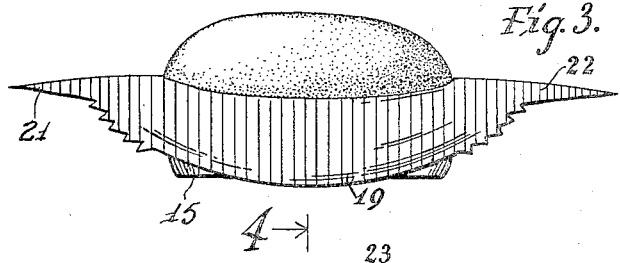
Figure 3 represents a side elevational view of the deviled crab illustrated in Figure 2, and formed in accordance with my invention.
Figure 4:
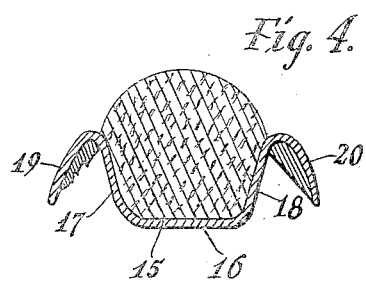
Figure 4 represents a sectional, elevational view along the line 4—4 of Figure 3.

When the container is to bear a similitude to a deviled crab, it may be an exact similitude in size and shape to a crab shell, as illustrated in Fig. 1, or the container may bear a general similitude to a crab shell without being identical in size and shape. Thus, as illustrated in Figure 2, the container may comprise a receptacle portion 15 having a bottom 16 and walls 17 and 18, downwardly projecting forward and rearward skirt portions 19 and 20, and latterly projecting handle members 21 and 22 simulating the major spines of a crab.

Figure 5:
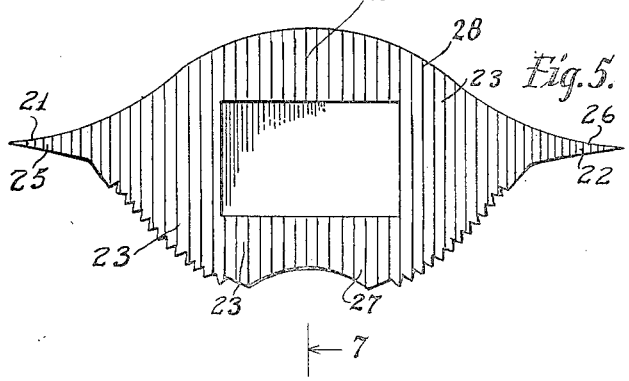
Figure 5 represents a plan view of a container of a further modified construction embodying my invention.
Figure 7:
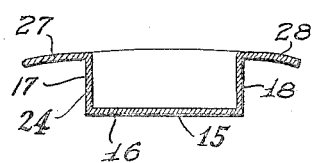
Figure 7 represents a sectional elevational view taken along the line 7—7 of Figure 6.
Figure 6:
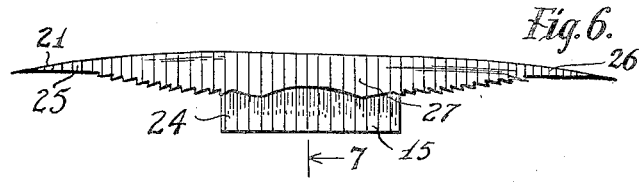
Figure 6 represents a side elevational view of the container illustrated in Figure 5, and embodying my invention.

If desired, however, the container may bear only a suggestive similitude to a crab shell, as illustrated in Figure 5. Thus, the container may comprise a receptacle, such as the box-like receptacle 24, having latterly projecting therefrom major spines 25 and 26 and forward and rearward flanges 27 and 28 having a shape suggestive of the periphery of a crab shell.

It is preferred that the food container of my invention be colored with a red vegetable dye when it is desired to simulate a crabshell, although any other innocuous pigment of any desired color may be used. This dye may be impregnated as well as coated.

In practice, containers of my invention may be shipped in large quantities and in desired specific sizes to restaurants and other large cooking establishments. In this connection, it is to be noted that different sizes of containers are desirable inasmuch as a deviled crab, ordered as such, would normally be of a larger size than a deviled crab such as that furnished on a sea-food platter.

In making a deviled crab in accordance with my invention, a crab-meat composition is formed in accordance with any desired recipe, and is placed in the receptacle part 15 of the food container of my invention, and molded, usually by hand, into the desired shape. Cracker dust is then molded by hand on the exposed portion of the crab-meat composition. The shell and the crab-meat composition are then inverted and dipped in a milk and egg batter, which is preferably, but not necessarily, made in the proportion of 4 eggs to a quart of milk and seasoned as desired. The shell is then reset in an upright position and bread crumbs are molded upon it. The whole is then fried in deep fat, preferably lard, at a temperature of 250° Fahrenheit.

The food container of my invention will not be substantially affected by frying in deep fat, and will bear a striking similitude to a real crab shell. The resultant deviled crab is completely sanitary and bears an attractive and palatable appearance.

Moreover, by shaping the receptacle 15 in the form illustrated in Figures 2 to 7 inclusive, there are no nooks and crannies into which the crab-meat may be inadvertently pushed by the diner, as is so often done in the case of real crab shells.

Furthermore, in accordance with the use of my invention, restaurants and other cooking establishments are enabled to keep large stocks of assorted sizes of whole, and completely sanitary, food containers, with no fear of decaying matter adhering thereto, or of breakage.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to be secured by Letters Patent is:

1. Means for cooking in deep fat and serving a food, comprising a papier-mâché container having a refractory ingredient and a carbohydrate ingredient, and shaped in a manner to simulate a crab-shell.

2. Means for cooking in deep fat and serving a food, comprising the product of the dehydration of a paper material permeated with a liquid ingredient, a carbohydrate ingredient, a refractory ingredient and a germicide.

3. Means for cooking in deep fat and serving a food, comprising the product of the dehydration of a cellulose derivative, permeated with a liquid suspension of a carbohydrate and a refractory ingredient.

4. Means for cooking in deep fat and serving a food, comprising a cellulose ingredient permeated with a carbohydrate and a refractory ingredient.

5. Means for cooking in deep fat and serving a food, comprising a cellulose ingredient and a clay ingredient.

6. Means for cooking in deep fat and serving a food, comprising a cellulose ingredient and a chalk ingredient.

7. Means for cooking in deep fat and serving a food, comprising the product of the dehydration of a plurality of sheets of paper, each in juxtaposition to the next, and permeated with a liquid ingredient, a carbohydrate ingredient, a refractory ingredient and a germicide.

8. Means for cooking in deep fat and serving a food, comprising the product of the dehydration of a plurality of sheets of cellulose derivative, each in juxtaposition to the next and permeated with a liquid suspension of a carbohydrate and a refractory ingredient.

9. Means for cooking in deep fat and serving a food, comprising a plurality of sheets of cellulose derivative in juxtaposition one with the next, and containing a carbohydrate, and a refractory ingredient.

10. Means for cooking in deep fat and serving a food, comprising a plurality of sheets of cellulose ingredient in juxtaposition one with the next, comprising a refractory ingredient, a binder ingredient and a carbohydrate ingredient.

11. Means for cooking in deep fat and serving a food, comprising the dehydrated product of an absorptive cellulose ingredient to which has been added a liquid suspension of a carbohydrate, at least fifty per cent, and a refractory ingredient of less than thirty-five per cent.

12. Means for cooking in deep fat and serving a food, comprising a papier-mâché container having a refractory ingredient, a carbohydrate ingredient and a binder ingredient and bearing the similitude of at least one object associated with said food in nature.

SAMUEL C. CUNNINGHAM.